Jan. 21, 1969  L. B. KNUDSEN ET AL  3,423,075
MIXING DEVICE
Filed Jan. 31, 1967

INVENTORS
Lawrence B. Knudsen
Aman D. Munjee
BY
*H. L. Gammons*
AGENT

United States Patent Office 3,423,075
Patented Jan. 21, 1969

3,423,075
MIXING DEVICE
Lawrence B. Knudsen, Middletown, and Aman D. Munjee, South Orange, N.J., assignors to National Lead Company, New York, N.Y., a corporation of New Jersey
Filed Jan. 31, 1967, Ser. No. 612,970
U.S. Cl. 259—8                    8 Claims
Int. Cl. B01f 7/16

ABSTRACT OF THE DISCLOSURE

The present invention relates in general to a mixing device and more especially to a mixing pump for blending dry and wet components to form and discharge a homogeneous slurry of the same.

Background of invention

The invention, as defined in the claims, pertains to agitating devices having vertical actuating means.

The mixing device of this invention may be used for mixing various wet and dry materials but its advantages are particularly evident in preparing acid-ore slurries for digestion according to known techniques for production of titanium dioxide pigment. These acid-ore slurries comprise mixtures of a titaniferous iron ore, and in particular ilmenite ore or titanium rich slags, and a strong acid such as for example concentrated sulfuric acid, and are fed into a digestion vessel, or the equivalent, where they are heated at elevated temperatures and quickly converted to a digestion cake consisting essentially of the sulfates of iron and titanium. These mixtures give rise to a unique problem of control in that when the acid and ore are not slurried sufficiently to form a homogeneous mixture a marked tendency exists for the components to react prematurely, i.e. before being heated to any appreciable extent, and form a thick paste which is extremely difficult to handle. However it has been discovered that when a truly homogeneous, or thoroughly slurried condition exists, this tendency for premature reaction is considerably lessened. Moreover, in order to effect the most economical use of the acid and the highest digestion recoveries it is essential that the acid and ore be thoroughly mixed so as to produce a truly homogeneous mixture.

While there are numerous mixing devices of earlier design by and large these are for mixing components which do not react prematurely to produce a semi-solid reaction product if improperly mixed. As a consequence relatively complex structures featuring numerous rotating parts, barriers, pins, shields, bearings and the like have been used. Typical structures in this category are the mixing devices shown in the following prior art patents: U.S. 2,641,453, Pin Mixer, June 9, 1953; U.S. 2,787,447, Continuous Mixer, Apr. 2, 1957; U.S. 3,158,358, Materials Blending Machine, Nov. 24, 1964. In contradistinction it has been found that to produce homogeneous mixtures of reactive components such as acid and ore economically and without malfunctioning it is essential that the mixing device have a minimum number of moving parts, be free of obstructions that could foster blockage, and yet produce a homogeneous mixture rapidly and efficiently.

Summary of invention

The invention relates to an improved mixing device for forming uniform, homogeneous mixtures of reactive components quickly, and efficiently; and positively discharging the admixed components from the mixing device. A preferred embodiment of the invention comprises a substantially cylindrical casing which defines a mixing chamber into which the components to be mixed are fed, the dry component via a frusto-conical shaped funnel located in the top and center of the casing, and the wet component via a plurality of feed pipes located in the top of the casing at the base of the funnel such that the dry component is always being fed into the mixing chamber in the presence of the wet component. Mixing of the components is effected by means of an eccentric, floating impeller characterized by a disc supported in a substantially horizontal plane in the mixing chamber on the lower extremity of a drive shaft which projects upwardly through the funnel, the upper surface of the disc being provided with a plurality of upstanding vanes (see especially FIG. 3). The impeller is the only moving part of the mixing device which otherwise is free of mechanical elements of any kind. Moreover the eccentric mounting of the impeller (see especially FIG. 2) enables it to function as a pump for positively pumping the admixed components out of the casing via a discharge pipe which extends upwardly substantially vertically above the casing so as to provide hydrostatic pressure in the mixing chamber.

Figure 3:
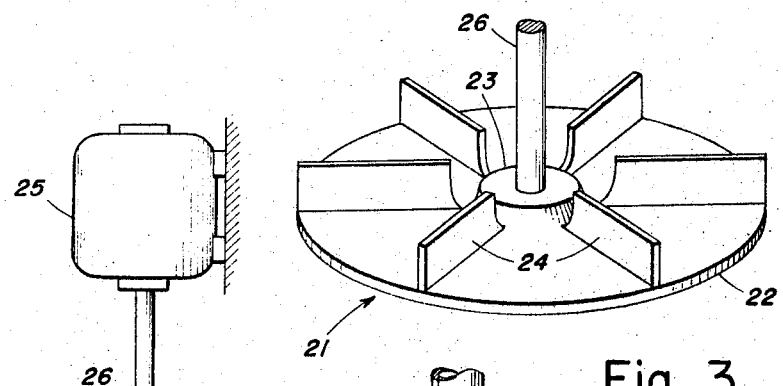
FIG. 3 is a perspective view of the impeller used in the mixing device of FIGURES 1 and 2.

Referring to the drawings the mixing device of this invention is shown as comprising a substantially cylindrical casing 10 comprising a cylindrical side wall 11 and top and bottom cover-plates 12 and 13 respectively. The cover plates are in the form of substantially flat discs which, in the present embodiment of the invention, are of greater diameter than the diameter of the cylindrical wall so as to extend beyond the periphery thereof, the top and bottom plates being secured to the upper and lower edges respectively of the wall by a plurality of circumferentially spaced flange bolts 14. It will be understood however that other equivalent means for securing the top and bottom cover-plates to the cylindrical sidewall may be used and are contemplated within the scope of the invention.

As so assembled the cylindrical wall 11 and top and bottom cover-plates define a substantially cylindrical mixing chamber 15 within the casing 10.

The top cover-plate 12 is provided with a relatively large central aperture 16 which opens into the mixing chamber 15. Secured to the top cover-plate 12 directly over its central aperture 16 is tubular feed-means 17 for feeding a dry ingredient to the mixing chamber 15. In the embodiment shown the feed-means 17 comprises a frusto-conical funnel the I.D. of the base of which corresponds substantially to the diameter of the aperture 16 in the top cover-plate so as to form a substantially unobstructed passage 18 therewith into said mixing chamber 15. The slope of the walls of the frusto-conical funnel is preferably about 12° to the vertical which angle is especially suitable for feeding finely divided dry ore into the mixing chamber. It will be understood however that the slope of the walls of the funnel 17 is not critical but may be varied depending upon the nature of the dry ingredients to be fed therethrough, and angles of from 0° to 20° are contemplated within the scope of the invention.

The dry ingredient is adapted to be fed into the top of the funnel 17 from any suitable source, one such source being an endless ore feed belt such as indicated generally at 19.

Figure 2:
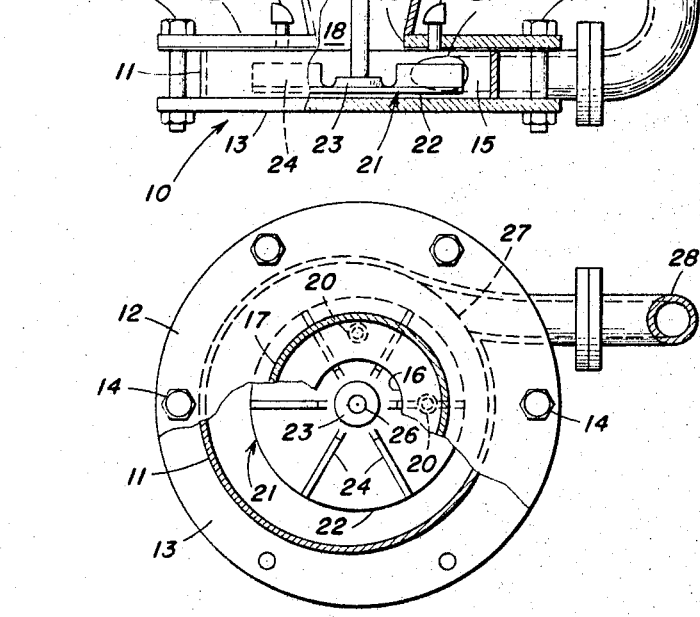
FIG. 2 is a plan view of the mixing device of FIG. 1.

Referring again to the casing 10 the latter is also provided with feed-means 20 for feeding a liquid ingredient into the mixing chamber. While earlier mixing devices consistently introduce two or more ingredients to be mixed into the mixing chamber through a single opening it has been discovered that when one of the ingredients is a dry material and the other a liquid that not infrequently the dry material will be wetted sufficiently by the liquid, prior to passing into the mixing chamber, so as to form a sticky paste at the entrance opening thereby plugging it up. This is especially true of a dry ore and an acid which, as pointed out above have a potential for reacting prematurely and forming a pasty reaction product. Efforts to avert this contingency by providing guards, diverting shields and the like in the central opening to the mixing chamber have only aggravated this problem as well as adding to the cost and complexity of construction of the mixing device. It has now been discovered that two or more ingredients one of which is dry and one wet can be quickly blended to form a homogeneous mixture and without malfunctioning of the mixing device by feeding the liquid ingredient into the mixing chamber from a plurality of points remote from the central opening to the mixing chamber, and more particularly from a plurality of points spaced circumferentially around the base of the dry ingredient feed-means, i.e. the funnel 17. In the present embodiment of the invention the liquid feed-means is shown as comprising four feed-pipes 20, see FIG. 2, set substantially vertically in the top cover-plate around the base of the funnel 17 each feeding into the mixing chamber 15. Liquid is adapted to be fed into each of these pipes from a common source (not shown) and enters into the mixing chamber at points directly above the hub-portion of an impeller 21. As a consequence the impeller is always in a wetted environment, the liquid cannot overflow the mixing chamber nor form a vortex such as to produce an air lock therein. Moreover the dry ingredient remains unwetted until it is well within the mixing chamber at which point it is quickly and thoroughly mixed with the liquid.

A thorough mixing of the wet and dry ingredients is effected by means of the impeller 21. As shown in FIG. 3 the impeller comprises a disc 22 having a central upstanding hub-portion 23 from which radiate a plurality of impeller vanes 24 the bottom edges of which are integral with the top of the disc 22. It has been found that when using an impeller of this design the dry and wet ingredients being fed into the mixing chamber are restrained by the disc-portion 22 of the impeller from passing through the radial vanes 24 and hence are maintained in intimate contact while being thoroughly blended by rotation of the impeller. The latter is adapted to be rotated by a power source, i.e. a motor 25 suitably mounted above the casing 10 and connected to the impeller by a shaft 26 the lower end of which is secured in the hub-portion 23 of the impeller.

Figure 1:
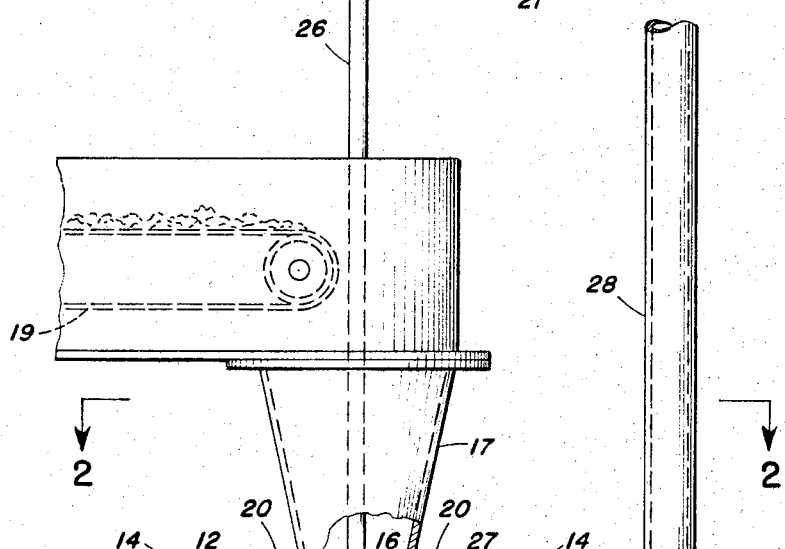
FIG. 1 is a vertical elevation, partly in section, of the novel mixing device of this invention.

It will be seen that in accordance with this construction the impeller has no fixed bearing in the casing and in effect floats therein which construction not only keeps the mixing chamber free of obstructions, and hence blockages, but permits a more rapid and thorough mixing of the wet and dry ingredients. Also it will be seen, by reference to FIGS. 1 and 2, that the drive shaft 26 and impeller 21 are asymmetrical with respect to the cylindrical mixing chamber so that the impeller 21 compresses the admixed ingredients within the chamber and thereby serves as pump-means to positively discharge the admixed ingredients from the casing.

The thoroughly mixed ingredients are discharged from the mixing chamber by the pumping action of the impeller through a tangential discharge opening 27 in the cylindrical wall of the casing 10 the mixed ingredients passing therefrom into a discharge pipe 28 connected in the tangential opening 27. It has been found that the action of the pump is optimum when there is some back-pressure in the mixing chamber and hence the discharge pipe is preferably arranged vertically to provide a hydrostatic head.

While the mixing device of this invention may be used for mixing most any type of pulverulent dry material with a liquid it is especially suitable for use in producing homogeneous mixtures of an ore and acid. Under such circumstances the materials of construction of the mixing device must be such as to resist the corrosive action of the acid. The mixing device of this invention is made of steel but other metals may be used, the simplicity of design adapting it ideally to most acid-resistant materials of construction.

The mixing device of this invention has been used successfully for mixing in the neighborhood of two hundred tons of dry ingredients with a liquid without malfunctioning of any kind. The dry material in this case was a finely ground ilmenite ore which was fed at the rate of 500 lbs. per minute into the mixing chamber 15 via a frusto-conical funnel 17 the walls of which had a slope of 12°. The liquid, which in this case was concentrated $H_2SO_4$, was fed simultaneously into the mixing chamber via the four feed pipes 20 at the rate of 50 gallons per minute. The impeller was rotated at 1150 r.p.m. The mixing device produced and discharged a homogeneous mixture of the acid and ore from the mixing chamber via the discharge pipe 28 with no blockages or other malfunctioning and proved itself to be a practical, safe and efficient unit for continuously mixing a particulate solid with a liquid.

While this invention has been described and illustrated by the examples shown, it is not intended to be strictly limited thereto, and other variations and modifications may be employed within the scope of the following claims.

We claim:

1. Apparatus for blending wet and dry ingredients comprising: a casing having a substantially cylindrical wall and top and bottom cover-plates, said cylindrical wall and cover-plates being arranged to form a mixing chamber within said casing, said top cover-plate having a central opening into said mixing chamber, said central opening being arranged asymmetrically with respect to the cylindrical wall of said chamber, said cylindrical wall having a discharge opening therein; dry feed-means supported above said asymmetrical central opening and arranged to feed a dry ingredient into said mixing chamber through said central opening; wet feed-means constructed and arranged to feed a wet ingredient into said mixing chamber through the top-cover thereof at a plurality of points circumscribing said central opening; means for mixing the wet and dry ingredients in said mixing chamber comprising an impeller supported within said mixing chamber and arranged asymmetrically with respect to its cylindrical wall; drive-means arranged to rotate said impeller in said chamber to admix said ingredients and positively discharge the admixed ingredients from said chamber via said discharge opening, and a discharge pipe connected to said discharge opening.

2. Apparatus for blending wet and dry ingredients according to claim 1 wherein said dry feed-means comprises a tubular member mounted on said top cover-plate over the central aperture therein the walls of said tubular member having a slope of from 0° to 20° to the vertical.

3. Apparatus for blending wet and dry ingredients according to claim 2 wherein said tubular member comprises a frusto-conical funnel the walls of which make an angle of about 12° to the vertical.

4. Apparatus for blending wet and dry ingredients according to claim 2 wherein said wet feed-means comprises a plurality of inlet pipes mounted in said top cover-plate at substantially equally spaced points around the base of the tubular feed-means.

5. Apparatus for blending wet and dry ingredients according to claim 1 wherein said impeller comprises a disc having a multiplicity of radial substantially rectangular vanes integral with and extending upwardly from the upper surface of said disc the upper edges of said vanes being exposed and substantially parallel to the underside of the top-plate of said chamber.

6. Apparatus for blending wet and dry ingredients according to claim 5 wherein said impeller is supported within said mixing chamber by a drive shaft connected at its lower end to said impeller, said drive shaft being arranged to extend upwardly through the tubular feed-means to said drive means.

7. Apparatus for blending wet and dry ingredients according to claim 1 wherein said discharge pipe is arranged to provide hydrostatic pressure at said discharge opening.

8. Apparatus for blending wet and dry ingredients comprising: a casing having a substantially cylindrical wall and top and bottom cover-plates, said cylindrical wall and cover-plates being arranged to form a mixing chamber within said casing, said top cover-plate having a central opening into said mixing chamber and said cylindrical wall having a discharge opening therein; dry feed-means supported above said central opening and arranged to feed a dry ingredient into said mixing chamber through said central opening; wet feed means constructed and arranged to feed a wet ingredient into said mixing chamber through the top-cover thereof at a plurality of points circumscribing said central opening; means for mixing the wet and dry ingredients in said mixing chamber comprising an impeller arranged asymmetrically within said mixing chamber, said impeller comprising a disc having a multiplicity of radial vanes integral with and extending upwardly from the upper surface of said disc, said impeller being supported within said mixing chamber by a drive shaft connected at its lower end to said impeller, said drive shaft being arranged to extend upwardly through the tubular feed-means, drive means arranged to be connected to the upper end of said drive shaft to rotate said impeller in said chamber to admix said ingredients and positively discharge the admixed ingredients from said chamber via said discharge opening, and a discharge pipe connected to said discharge opening.

References Cited

UNITED STATES PATENTS

| | | | |
|---|---|---|---|
| 2,498,209 | 2/1950 | Iredale | 259—8 |
| 2,641,453 | 6/1953 | Teale | 259—8 |
| 3,256,181 | 6/1966 | Zingg | 252—8.55 |

FOREIGN PATENTS

| | | |
|---|---|---|
| 69,352 | 1/1952 | Netherlands. |

ROBERT W. JENKINS, *Primary Examiner.*

U.S. Cl. X.R.

259—96